US007407053B2

(12) United States Patent
Rossiter

(10) Patent No.: US 7,407,053 B2
(45) Date of Patent: Aug. 5, 2008

(54) MEDIA HOLDING PACKAGE

(75) Inventor: Shane P Rossiter, New York, NY (US)

(73) Assignee: Meadwestvaco Corporation, Glen Allen, VA (US)

( * ) Notice: Subject to any disclaimer, the term of this patent is extended or adjusted under 35 U.S.C. 154(b) by 503 days.

(21) Appl. No.: 10/500,710

(22) PCT Filed: Jan. 6, 2003

(86) PCT No.: PCT/US03/00225

§ 371 (c)(1),
(2), (4) Date: Jul. 2, 2004

(87) PCT Pub. No.: WO03/058626

PCT Pub. Date: Jul. 17, 2003

(65) Prior Publication Data

US 2004/0262177 A1    Dec. 30, 2004

Related U.S. Application Data

(60) Provisional application No. 60/344,340, filed on Jan. 4, 2002.

(51) Int. Cl.
*B65D 85/30* (2006.01)
*B65D 85/57* (2006.01)
(52) U.S. Cl. .................... 206/308.1; 206/312; 206/311; 206/309

(58) Field of Classification Search ............... 206/307, 206/307.1, 308.1, 312, 313, 303, 445, 460, 206/472, 473, 499, 558
See application file for complete search history.

(56) References Cited

U.S. PATENT DOCUMENTS

| 4,709,812 | A | * | 12/1987 | Kosterka | 206/308.1 |
| 5,269,409 | A | * | 12/1993 | Brandt et al. | 206/303 |
| 5,372,253 | A | * | 12/1994 | O'Brien et al. | 206/308.1 |
| 5,593,030 | A | * | 1/1997 | Tell | 206/308.1 |
| 5,682,991 | A | * | 11/1997 | Lammerant et al. | 206/308.1 |
| 5,743,390 | A | * | 4/1998 | Pozzoli | 206/308.1 |
| 5,884,761 | A | * | 3/1999 | Gelardi et al. | 206/308.1 |
| 5,894,924 | A | * | 4/1999 | Koch | 206/308.1 |
| 6,168,015 | B1 | * | 1/2001 | Shimizu | 206/308.1 |
| 6,290,060 | B1 | | 9/2001 | Burtch | |

FOREIGN PATENT DOCUMENTS

FR    2803079    6/2001
NL    1016314    6/2002

* cited by examiner

*Primary Examiner*—J. Gregory Pickett

(57) ABSTRACT

A boxed disc package has a box with a base and a foldable rigid creased board having multiple parallel creases. Mounting board-receiving panels and spines are formed and separated by the creases. Plural tray-holding boards are mounted on the board-receiving panels. Plural disc-holding trays are mounted on the plural tray-holding boards. One of the board-receiving panels of the foldable right creased board is secured in the box base. The remaining board-receiving panels with the attached tray-holding boards, trays and discs are folded around the spines for overlying each other and folding into the box base.

30 Claims, 3 Drawing Sheets

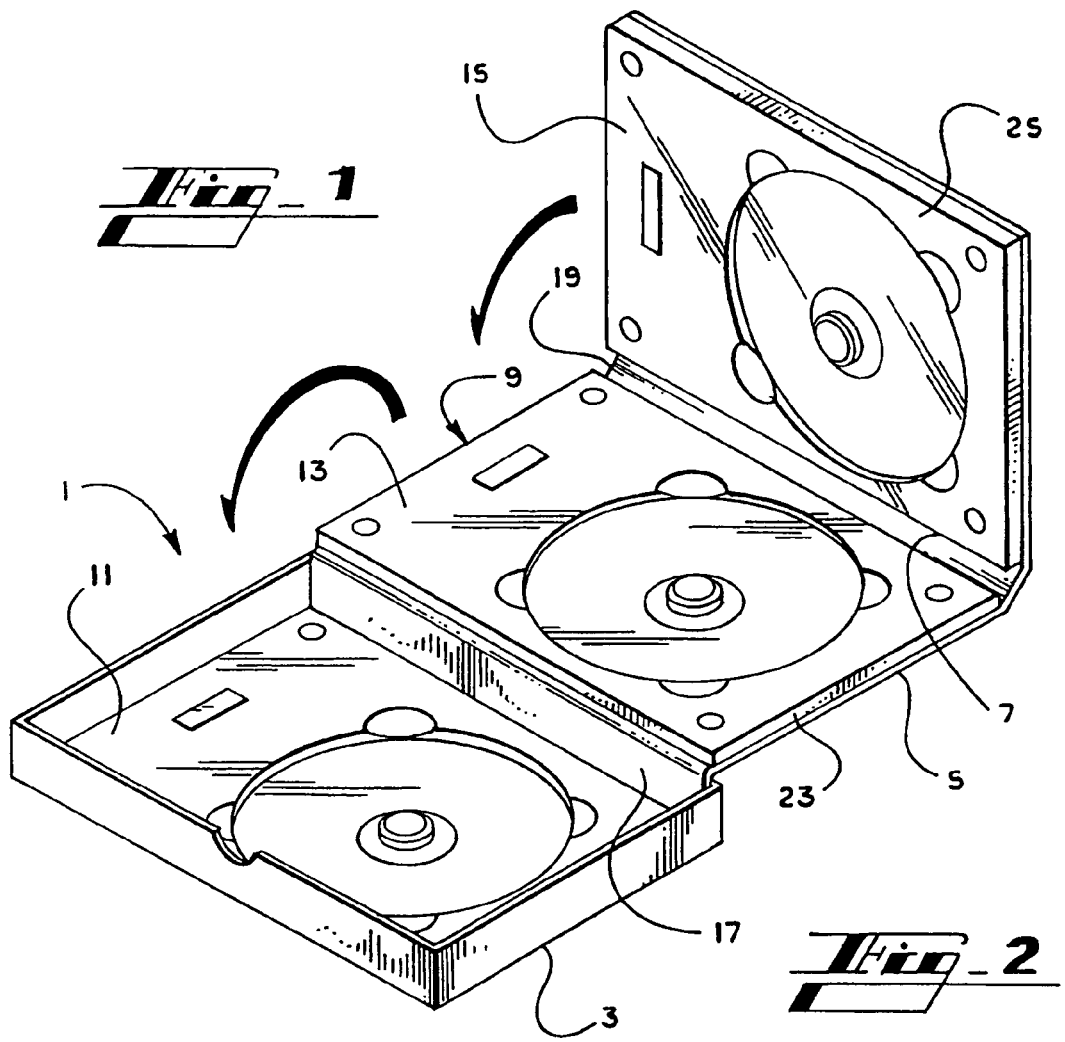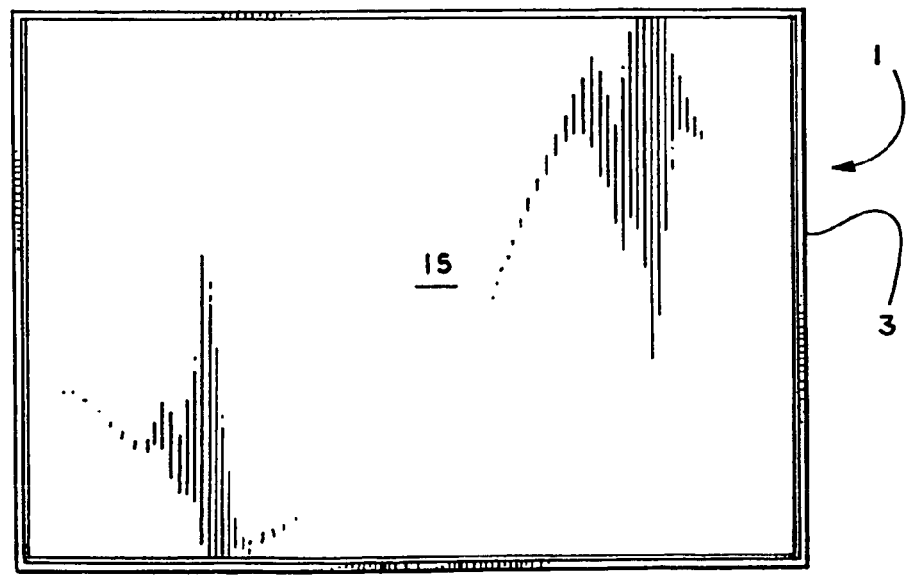

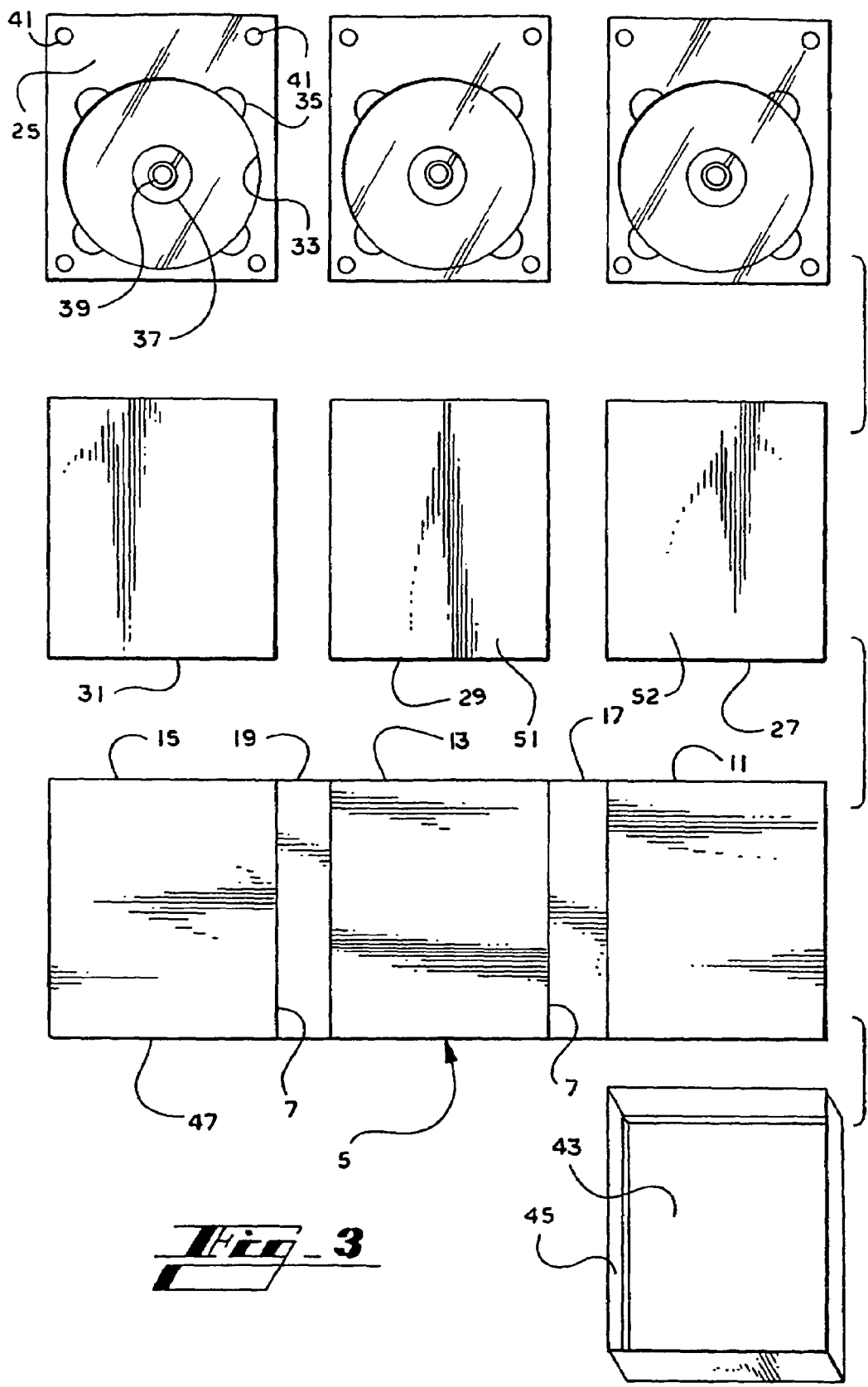
Fig_3

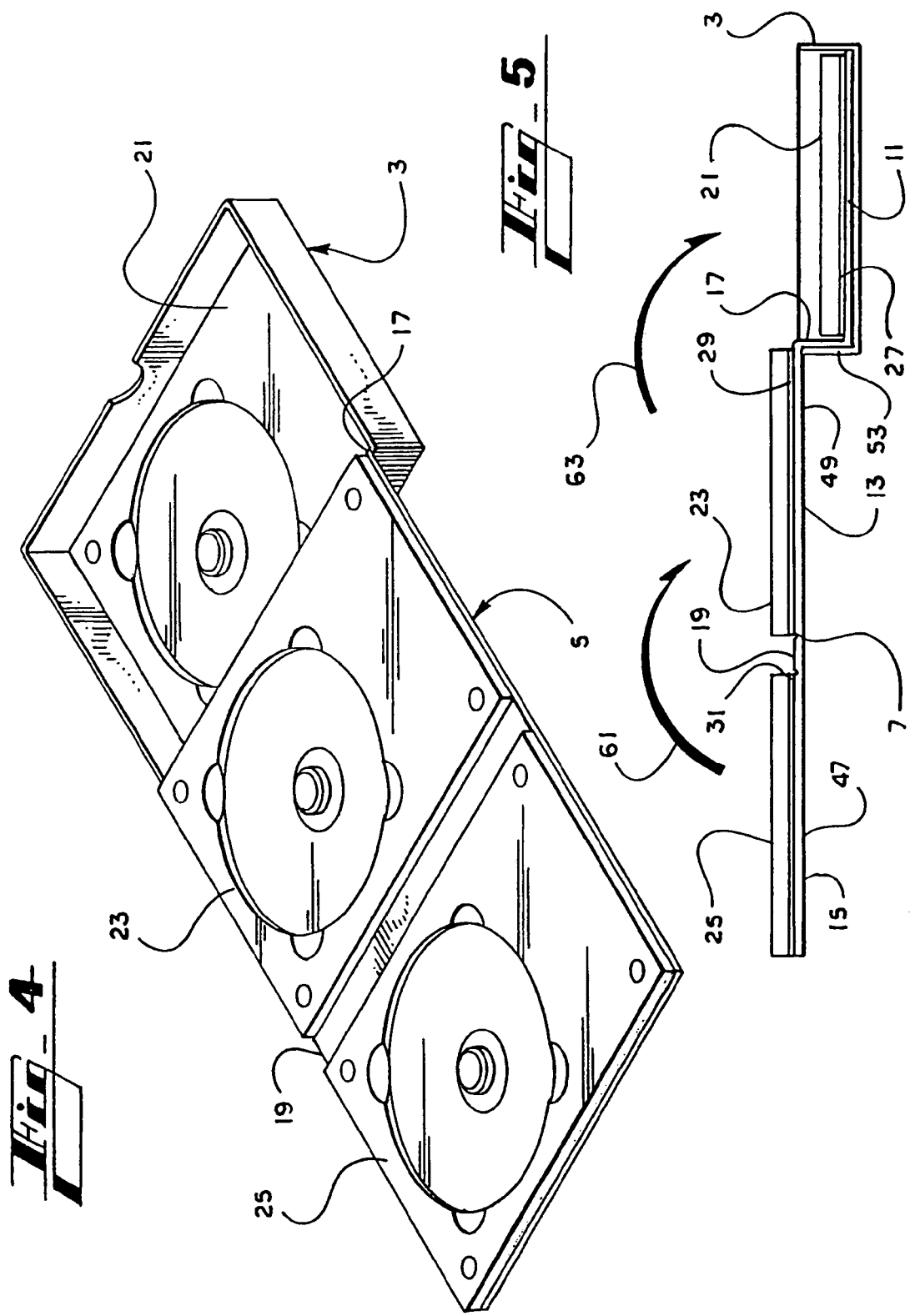

MEDIA HOLDING PACKAGE

This application claims the benefit of U.S. Provisional Application No. 60/344,340 filed Jan. 4, 2002 and PCT/US03/00225 filed Jan. 6, 2003.

BACKGROUND OF THE INVENTION

This invention relates to media holding packages.

Several media holding packages are known in the art. Some of the packages are suitable for holding multiple recording products. Many of the packages are functional in nature. Needs exist for improved packages which are useful for storing multiple media or recordings and which are attractive and suitable for presentation without further wrapping or embellishment.

SUMMARY OF THE INVENTION

A new media-holding box is provided by the present invention. The new package is suitable for holding and storing media and is particularly attractive. The new package is created to attract the attention of prospective purchasers. The new boxes are particularly suited for presentations or for giving as gifts. The new disc boxes hold any number of discs. The boxes may be assembled before discs are inserted. Discs may be inserted in trays, which are attached to rigid boards to complete the disc-holding boxes. Lengthening or shortening the rigid creased board, changing lengths of spines and changing depth of the box base accommodates any number of discs.

In one form of the invention rigid creased boards are made of chips or fibers. The boards are creased to create alternating tray-holding panels and spines. The back surfaces of the boards are covered with a decorative coating—for example a silver Mylar film. At least the back of the panel most distant from the box base is decoratively coated to provide an attractive package. Graphics may be printed on labels or directly screened or printed on outer surfaces of the packages.

The present invention is well suited to the manufacture of the box base and board parts and the gluing and attachment of the box base and board parts before final assembly of the trays. The trays are loaded with discs before the loaded trays are attached to the boards. Alternatively, the empty trays are attached to the boards before the discs are mounted in the trays. Before mounting trays on the boards, glue is placed in four recesses near corners of bottoms of the trays.

In a preferred embodiment one disc-mounting panel is glued to an inner bottom of the box. The longer first spine immediately adjacent to the fixed panel is glued to a sidewall of the box. The opposite sidewall has a recess adjacent its edge. The base box tightly holds the second spine and the folded panels. A thumb of the user placed in the recess enables the user to contact the second spine and to tip the panels out of the box base. The tray on the panel, which is secured to the box base, is first exposed. Rotating the outer folded panel around the second spine, which is remote from the box base, provides access to the other trays.

In one embodiment a boxed disc package includes a box base. A foldable rigid board has multiple parallel hinge creases. The creases separate the board into alternating tray-receiving panels and intermediate spines. Tray-holding boards are mounted on the panels. Disc-holding trays are mounted on the tray-holding boards. The back of one panel of the foldable rigid creased board is secured in a bottom of the box base. The remaining board receiving panels with the attached tray-holding boards and trays are folded successively around the spines for overlying each other and tipping into the box base, thereby forming the boxed disc package.

BRIEF DESCRIPTION OF THE DRAWINGS

FIG. 1 is a perspective view of the opened disc box apparatus.

FIG. 2 is a top of view of the closed disc box apparatus.

FIG. 3 is an exploded view of the disc box apparatus.

FIG. 4 is an assembled view of the disc box apparatus shown in FIG. 3.

FIG. 5 is a side elevation, partially in cross section, of the assembled disc box apparatus shown in FIG. 4.

DETAILED DESCRIPTION OF THE PREFERRED EMBODIMENTS

Referring to FIGS. 1-5, a disc box for a boxed set of discs is generally indicated by the numeral 1. The disc box has a box base 3. The three dimensional open top cardboard box base is covered with a decorative sheet in a manner that is well known in the gift box art. Creases 7 divide a foldable rigid creased board 5 into multiple hinged areas 9. The multiple hinged areas 9 include disc tray-receiving panels 11,13 and 15 and separating spines 17 and 19. The back of the end panel 11 is secured to the inner bottom of the box base 3. Preferably the back of the foldable rigid creased board 5 is covered with decorative material, such as a thin lamination of silver Mylar.

Disc trays 21,23 and 25 are mounted on individual tray-holding boards 27, 29 and 31. The tray-holding boards are glued to the panels 11, 13 and 15 of the rigid creased board 5. Preferably the tray-holding boards are covered with a decorative material, such as a thin lamination of silver Mylar, which is visible through the clear trays. The disc trays 21,23 and 25 have central disc-receiving depressions 33 with finger openings 35. Central rosettes 37 have depressible central buttons 39 to release the discs, which are held in the trays. Four glue receivers 41 are positioned at corners of each tray to hold glue. The glue secures the trays on the decorative Mylar layers on the tray-holding boards.

After discs are attached to the trays 21, 23 and 25, the outer panels 15 is folded on the middle panel 13. The two folded-together panels are tipped into the box base 3, forming a package 1, as shown in FIG. 2.

FIG. 3 shows the parts of the package 1 before it is assembled. The disc trays 21, 23 and 25 may be mounted on the individual tray-holding boards 27, 29 and 31. The tray-holding boards are secured to the appropriate panels 11, 13 and 15 of the rigid creased board 5. The back of panel 11 is glued to the inner bottom 43 of the box base 3. The box base 3 is initially prepared by forming a chipboard, fiberboard or cardboard box. The box is coated with a decorative covering, such as a white opaque sheet material 45, in a well-known box manufacturing method.

The rigid creased board 5 is coated on its back 47 with a decorative sheet such as a reflective silver Mylar film 49. The individual tray-holding boards 27, 29 and 31 are initially coated on their tray-holding sides 51 with a decorative sheet called such as a reflective silver Mylar film 52. The individual trays 21, 23 and 25 may be glued onto the tray-holding boards before the boards are glued to the panels of the rigid creased board. Preferably, the tray-holding boards are glued to the panels of the rigid creased board before the trays are mounted on the tray-holding boards.

As shown in FIG. 4, the entire disc box apparatus is assembled before discs are placed in the trays. Alternatively the discs may be placed in the trays before the back of panel 11 is glued to the inner bottom of the box. As a further alternative the discs may be mounted in the trays before the trays are glued to the tray-holding boards.

FIG. 5 shows a partially cross sectional view of the disc box 1. Panel 11 is glued in the bottom 43 of the base box 3. Preferably the longer spine 17 lies along and is glued to the inner sidewall 53 of the box. First, the tray 25 attached to the outer panel 15 is folded 61 over spine 19. The tray 25 attached to the outer panel then overlies the tray 23 attached to the middle panel 13. The folded-together outer and middle trays are folded 63 along the crease at the top of spine 17 into the box base 3. The package 1 is completed with a label or screened or printed graphic on the outward facing back of panel 15 or on the outside of the base box 3.

The disc box package may be constructed with trays for holding fewer or more than three discs. For example, the panel 15 and tray 25 may be omitted, and the length of the spine 17 may be reduced to accommodate a thickness of only two mounted trays. At the same time the side walls of the box may be reduced to accommodate only the two trays. Alternatively the spine 17 and the box sidewalls may be reduced to accommodate the thickness of only one tray-holding board and two layers of the rigid creased board.

As a further alternative, gluing one panel to the bottom 43 of the disc box base 3 may be eliminated. In that embodiment only the wider spine 17 is glued to the inner sidewall 53 of the box base 3. Conversely, when the back of the inner panel 11 is glued to the bottom 43 of the box base, gluing the outside of the spine 17 to the sidewall 53 of the box base may be omitted.

In preferred embodiments, the creases 7 are formed in the upper surface of the board 5, except for the crease 55 between spine 17 and panel 13. Crease 55 is formed on both sides of board 5, so that the hinge formed along that crease can bend 180° (90° in both opposite directions). The remainder of the creases 7 are single-sided so that the board 5 folds through 90° and opens and extends away from the box 3 in a flat configuration.

Several trays and discs may be accommodated by the new package by increasing the lengths of the spines and by increasing the numbers of panels on which the tray-holding boards and trays are mounted.

I claim:

1. A boxed disc package apparatus, comprising a box base, a foldable rigid creased board having multiple parallel creases and having board-receiving panels and spines separated by the creases, plural tray-holding boards mounted on the board-receiving panels, plural disc-holding trays mounted on the plural tray-holding boards, one of the board-receiving panels of the foldable rigid creased board being attached to a bottom of the box base, whereby remaining board-receiving panels with the attached tray-holding boards and trays are foldable around the spines for overlying each other and folding into the box base, thereby forming the boxed disc package apparatus.

2. The apparatus of claim 1, wherein the board-receiving panels with the attached tray-holding boards and trays are foldable around the creases, perpendicular to the spines for overlying each other and folding the panels, spines, boards and trays into the box base, thereby forming the boxed disc package apparatus.

3. The apparatus of claim 1, wherein the spines are positioned along opposite side walls of the box.

4. The apparatus of claim 3, wherein an uppermost panel has one of the tray-holding boards mounted on an inward facing side.

5. The apparatus of claim 3, wherein one of the panels on the board has outer and inner faces, wherein one of the boards is mounted on the inner face, and wherein, panels, boards and trays are folded around the spines the box, the outer face forms a cover.

6. A method of packaging multiple discs and trays in a box, comprising:
   forming a box having a bottom and sides extending upward from the bottom;
   creasing a board and forming alternating tray-receiving panels and spines between creases on the board;
   attaching disc-mounting trays on the panels;
   mounting a first end panel inside the bottom of the box;
   mounting a first end spine along one side of the box;
   extending an intermediate panel from the first end spine;
   extending a second end spine from the intermediate panel;
   extending a second end panel from the second end spine;
   placing discs in the trays;
   folding the second end panel and the attached tray and disc over the intermediate panel and the attached tray and disc; and
   folding the second end panel and the intermediate panel into the box over the first panel and the attached tray and disc.

7. The method of claim 6, further comprising forming a top of the box with a back of the intermediate panel.

8. The method of claim 6, further comprising securing a back of the first panel inside the bottom of the box.

9. The method of claim 6, further comprising securing an outside of the first spine inside a first side of the box.

10. The method of claim 9, further comprising placing the second end spine inside a side of the box opposite the first side.

11. The method of claim 9, further comprising forming a first side of the box with the first spine.

12. A boxed disc package apparatus, comprising a box, a foldable carrier having multiple parallel sections and having alternating tray-holding panels and spines forming the sections, plural disc-holding trays mounted on the plural tray-holding panels, one section of the foldable carrier being secured to a base of the box, wherein one section of the tray-holding panels includes an inner one of the spines which is attached to a sidewall extending upward from the box base, wherein the tray-holding panels and trays are foldable around the creases and the spines for overlying each other and for folding the panel and trays into the box base, thereby forming the boxed disc package apparatus.

13. The apparatus of claim 12, wherein the spines are positioned along opposite side walls of the box.

14. The apparatus of claim 13, wherein the panels comprise a first panel mounted in the box base and a medial panel hinged near a side of the box base, wherein the medial panel has one of the trays mounted on an inward facing surface, wherein an outward facing surface of the medial panel forms a cover for the box base when the panels and trays are folded into the box base.

15. The apparatus of claim 13, wherein one of the panels on the foldable carrier has outer and inner faces, wherein one of the trays is mounted on the inner face, and wherein, when the panels and trays are folded around the spines and into the box, the outer face forms a cover.

16. A boxed disc package apparatus, comprising a box base, a foldable creased carrier having multiple parallel creases and having alternating tray-holding panels and spines separated by the creases, plural disc-holding trays mounted on the panels, one of the tray-holding panels of the foldable creased carrier being hinged to a sidewall extending upward from a bottom wall of the box base, whereby remaining tray-holding panels with the mounted trays are foldable around the creases and spines for overlying each other and folding the panels, spines, and trays into the box base, thereby forming the boxed disc package apparatus.

17. The apparatus of claim 16, wherein alternating spines are positioned along opposite side walls of the box.

18. The apparatus of claim 16, wherein an uppermost panel has one of the trays mounted on an inward facing surface.

19. The apparatus of claim 16, wherein one of the panels has outer and inner surfaces, wherein one of the trays is mounted on the inner surface, and wherein, when the panels and trays are folded around the spines and into the box, the outer surface forms a cover.

20. Disc package apparatus, comprising a box, a foldable creased carrier board having multiple parallel creases and having alternating disc-holding panels and spines separated by the creases, disc-holding trays mounted on the panels, an innermost one of the spines of the foldable creased carrier board being fixedly mounted on a sidewall extending upward from a bottom wall of the box, whereby the panels with the attached trays are foldable around the spines for overlying each other and folding into the box, thereby forming the disc package apparatus.

21. The apparatus of claim 20, wherein the creased carrier board has a first end panel and an opposite second end panel, and at least one intermediate panel and a first end spine connecting the first end panel to the at least one intermediate panel, and a second end spine connecting the second end panel to the at least one intermediate panel, wherein the first panel is positioned along a bottom of the box and the first end spine is positioned along one side of the box.

22. The apparatus of claim 21, wherein the first end spine extends from the bottom of the box to a top of the box.

23. The apparatus of claim 21, wherein the first end spine comprises the side of the box.

24. The apparatus of claim 21, wherein the second end spine is of sufficient length for allowing juxtaposition of trays mounted on the second end panel and the at least one intermediate panel, and wherein the first end spine is of sufficient length for allowing stacking of the trays within the box with an outer side of the at least one intermediate panel forming a top of the box.

25. A method of packaging multiple discs and trays in a box, comprising:
 forming a box having a bottom and sides extending upward from the bottom;
 creasing a board and forming alternating tray-receiving panels and spines between creases on the board;
 extending an inner panel from one of the sides extending upward from the bottom of the box;
 extending an outer spine from the inner panel;
 extending an outer panel from the outer spine;
 placing discs in disc-mounting trays and connecting the trays on the panels;
 folding the outer panel and the attached tray and disc over the inner panel and the attached tray and disc; and
 folding the outer panel and the inner panel into the box.

26. The method of claim 25, further comprising forming a top of the box with a back of the inner panel.

27. The method of claim 25, further comprising securing a tray and disc inside the bottom of the box.

28. The method of claim 25, further comprising securing an outside of a first spine inside a first side of the box.

29. The method of claim 28, further comprising placing the outer spine inside a second side of the box opposite the first side.

30. The method of claim 28, further comprising forming a first side of the box with the first spine.

* * * * *